US010247826B2

United States Patent
Shiraki

(10) Patent No.: US 10,247,826 B2
(45) Date of Patent: Apr. 2, 2019

(54) DETECTION APPARATUS, FISH FINDER, AND RADAR

(71) Applicant: FURUNO ELECTRIC CO., LTD., Nishinomiya, Hyogo (JP)

(72) Inventor: Rika Shiraki, Amagasaki (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 338 days.

(21) Appl. No.: 15/160,666

(22) Filed: May 20, 2016

(65) Prior Publication Data
US 2017/0097416 A1    Apr. 6, 2017

(30) Foreign Application Priority Data

Oct. 6, 2015 (EP) .................................. 15188489

(51) Int. Cl.
*G01S 15/00* (2006.01)
*G01S 15/96* (2006.01)
(Continued)

(52) U.S. Cl.
CPC .............. *G01S 15/96* (2013.01); *G01S 7/539* (2013.01); *G01S 7/6209* (2013.01);
(Continued)

(58) Field of Classification Search
USPC ......................................................... 367/99
See application file for complete search history.

(56) References Cited

U.S. PATENT DOCUMENTS 4,721,961 A * 1/1988 Busignies ............... G01S 11/06
342/22
5,260,912 A * 11/1993 Latham ................... G01S 7/527
367/104
(Continued)

FOREIGN PATENT DOCUMENTS

| JP | 05-196733 A | 8/1993 |
|----|-------------|--------|
| JP | 2000-147118 A | 5/2000 |
| JP | 3930166 B | 6/2007 |

OTHER PUBLICATIONS

Malgortaza Goldewska et al., How pulse lengths impact fish stock estimations during hydroacoustic measurements at 70 kHz, Aquatic Living Resources, Jan. 1, 2011, pp. 71-78, vol. 24, No. 1, EDP Sciences.

(Continued)

Primary Examiner — James R Hulka
(74) Attorney, Agent, or Firm — Studebaker & Brackett PC

(57) ABSTRACT

A detection apparatus is provided. The detection apparatus includes a hardware processor programmed to at least calculate a first echo intensity of a first reception signal generated from a reception wave reflected on reflection objects, calculate a second echo intensity of a second reception signal generated from a reception wave reflected on the reflection objects, a signal duration of the second reception signal being shorter than that of the first reception signal, generate a first frequency distribution of the first echo intensity, generate a second frequency distribution of the second echo intensity, and extract a density of the reflection objects or an index of density of the reflection objects based on a comparison of the first frequency distribution and the second frequency distribution.

18 Claims, 13 Drawing Sheets

(51) Int. Cl.
*G01S 7/62* (2006.01)
*G01S 15/89* (2006.01)
*G01S 7/539* (2006.01)
*G01S 15/10* (2006.01)
*G01S 7/41* (2006.01)
*G01S 13/28* (2006.01)
*G01S 13/30* (2006.01)

(52) U.S. Cl.
CPC ............ *G01S 15/108* (2013.01); *G01S 15/89* (2013.01); *G01S 7/412* (2013.01); *G01S 13/28* (2013.01); *G01S 13/30* (2013.01); *G01S 15/104* (2013.01)

(56) References Cited

U.S. PATENT DOCUMENTS

| | | | | |
|---|---|---|---|---|
| 5,561,641 | A * | 10/1996 | Nishimori | G01S 3/80 367/110 |
| 7,495,994 | B2 * | 2/2009 | Makris | G01S 7/52004 367/11 |
| 2004/0165478 | A1 * | 8/2004 | Harmon, Jr. | G01S 7/539 367/87 |
| 2004/0178948 | A1 * | 9/2004 | Axelsson | G01S 13/325 342/118 |
| 2006/0164919 | A1 * | 7/2006 | Watanabe | B06B 1/0269 367/153 |
| 2006/0280030 | A1 * | 12/2006 | Makris | G01S 7/52004 367/11 |
| 2010/0046326 | A1 * | 2/2010 | Lovik | G01S 7/52001 367/87 |

OTHER PUBLICATIONS

J. Guillard et al., Standardization of hydroacoustic methods—Effect of pulse duration, Retrieved from the Internet: URL: http://promitheas.iacm.forth.gr/uam_proceedings/uam2009/25-7.pdf, Jan. 1, 2009.

Jan Kubecka, Effect of pulse duration and frequency bandwidth on fish target strength and echo shape in horizontal sonar applications, XII Symposium on Hydroacoustics Jurata May 16-19, 1995, pp. 187-194.

M. Godlewska et al., Hydroacoustic measurements at two frequencies: 70 and 120 kHz—consequences for fish stock estimation, Fisheries Research, Feb. 1, 2009, pp. 11-16, vol. 96, No. 1, Elsevier, Amsterdam, NL.

Extended European Search Report of the corresponding European Patent Application No. 15188489.7, dated Apr. 4, 2016.

* cited by examiner

DETECTION APPARATUS, FISH FINDER, AND RADAR

CROSS-REFERENCE TO RELATED APPLICATION(S)

This application claims priority under 35 U.S.C. § 119 to European Patent Application No. EP 15188489.7, which was filed on Oct. 6, 2015, the entire disclosure of which is hereby incorporated by reference.

TECHNICAL FIELD

The present disclosure relates to a detection apparatus, a fish finder, and a radar able to estimate a density of target objects.

BACKGROUND

As a detection apparatus capable of estimating density of target objects, there is for example the quantitative fish finder disclosed in JP3930166B that estimates density of objects (fish). Specifically, the quantitative fish finder has a transmission module that transmits a transmission signal having a long pulse width and a transmission signal having a short pulse width, and calculates a density distribution of a fish school (target object) based on a long pulse reception signal and a short pulse reception signal obtained from reflection waves from each transmission signal transmitted by the transmission module. In this quantitative fish finder, the fish school density is calculated by dividing a volume backscattering strength per unit volume of the fish school calculated based on the long pulse reception signal by a target strength of single fish calculated based on the short pulse reception signal.

SUMMARY (1) In one aspect of the present disclosure, a detection apparatus is provided. The detection apparatus includes a hardware processor programmed to at least calculate a first echo intensity of a first reception signal generated from a reception wave reflected on reflection objects, calculate a second echo intensity of a second reception signal generated from a reception wave reflected on the reflection objects, a signal duration of the second reception signal being shorter than that of the first reception signal, generate a first frequency distribution of the first echo intensity, generate a second frequency distribution of the second echo intensity, and extract a density of the reflection objects or an index of density of the reflection objects based on a comparison of the first frequency distribution and the second frequency distribution.

(2) The detection apparatus may further include a transducer configured to transmit a transmission wave. The hardware processor may be further programmed to at least compress the first reception signal generated from the reception wave resulting from a reflection of the transmission wave on the reflection objects to generate the second reception signal, and calculate the second echo intensity from the second reception signal.

(3) The detection apparatus may further include a transducer configured to transmit a first transmission wave and a second transmission wave, a pulse width of the second transmission wave being shorter than that of the first transmission wave. The hardware processor may be further programmed to at least calculate the first echo intensity based on a reception wave resulting from a reflection of the first transmission wave on the reflection objects, and calculate the second echo intensity based on a reception wave resulting from a reflection of the second transmission wave on the reflection objects.

(4) The hardware processor may be further programmed to at least calculate the first echo intensity by compensating for a beam width in which the transmission wave is transmitted by the transducer, and calculate the second echo intensity by compensating for the beam width.

(5) The hardware processor may be further programmed to at least calculate the first echo intensity by compensating for a beam width in which the first transmission wave is transmitted by the transducer, and calculate the second echo intensity by compensating for a beam width in which the second transmission wave is transmitted by the transducer.

(6) The hardware processor may be further programmed to at least calculate the first echo intensity by compensating for the duration of the first reception signal, and calculate the second echo intensity by compensating for the duration of the second reception signal.

(7) The hardware processor may be further programmed to at least calculate volume backscattering strength of the first reception signal as the first echo intensity, and calculate volume backscattering strength of the second reception signal as the second echo intensity.

(8) The hardware processor may be further programmed to at least extract the density of the reflection objects or the index of density of the reflection objects based on a degree of similarity between the first frequency distribution and the second frequency distribution as a result of the comparison between the first frequency distribution and the second frequency distribution.

(9) The hardware processor may be further programmed to at least extract the density of the reflection objects or the index of density of the reflection objects based on a coefficient of cross-correlation between the first frequency distribution and the second frequency distribution as the degree of similarity.

(10) The detection apparatus may further include a memory configured to memorize a relationship between the cross-correlation coefficient and the density of the reflection objects, the relationship being obtained before the density of the reflection objects or the index of density of the reflection objects is extracted by the hardware processor. The hardware processor may be further programmed to at least calculate the cross-correlation coefficient, and extract the density of the reflection objects based on the calculated cross-correlation coefficient and the relationship memorized by the memory.

(11) The hardware processor may be further programmed to at least generate the first frequency distribution by counting occurrences of the first echo intensity in each interval obtained by segmenting an echo intensity range into a plurality of intervals, and generate the second frequency distribution by counting occurrences of the second echo intensity in each said interval.

(12) In another aspect of the present disclosure, a detection apparatus is provided. The detection apparatus includes a transducer and a hardware processor. The transducer is configured to transmit a first transmission wave and a second transmission wave, a beam width of the second transmission wave being smaller than that of the first transmission wave. The hardware processor is programmed to at least calculate a first echo intensity of a first reception signal generated from a reception wave resulting from a reflection of the first transmission wave on reflection objects, calculate a second echo intensity of a second reception signal generated from a reception wave resulting from a reflection of the second transmission wave on the reflection objects, generate a first frequency distribution of the first echo intensity, generate a second frequency distribution of the second echo intensity, and extract a density of the reflection objects or an index of density of the reflection objects based on a comparison of the first frequency distribution and the second frequency distribution.

(13) The hardware processor may be further programmed to at least calculate the first echo intensity by compensating for the beam width of the first transmission wave, and calculate the second echo intensity by compensating for the beam width of the second transmission wave.

(14) The hardware processor may be further programmed to at least calculate the first echo intensity by compensating for a duration of the first reception signal, and calculate the second echo intensity by compensating for a duration of the second reception signal.

(15) In another aspect of the present disclosure, a fish finder is provided. The fish finder includes any of the detection apparatus described above. The hardware processor may be programmed to at least extract the density or the index of density of a fish school as the reflection objects.

(16) In another aspect of the present disclosure, a radar is provided. The radar includes any of the detection apparatus described above.

Accordingly, the present disclosure can accurately calculate density of target objects.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

When calculating the target strength of a single fish as explained in the quantitative fish finder referenced above, an echo of a single fish within a fish school needs to be extracted. When a fish density within a fish school gets dense, echoes of a plurality of fish overlap each other and extraction of single fish echo is difficult. Furthermore, it is difficult to judge if the returning echo is from a single fish or from a plurality of fish, which makes a reliability of the calculated fish school density low.

Certain embodiments of this disclosure relates to more accurately calculating density of target objects.

Figure 1:
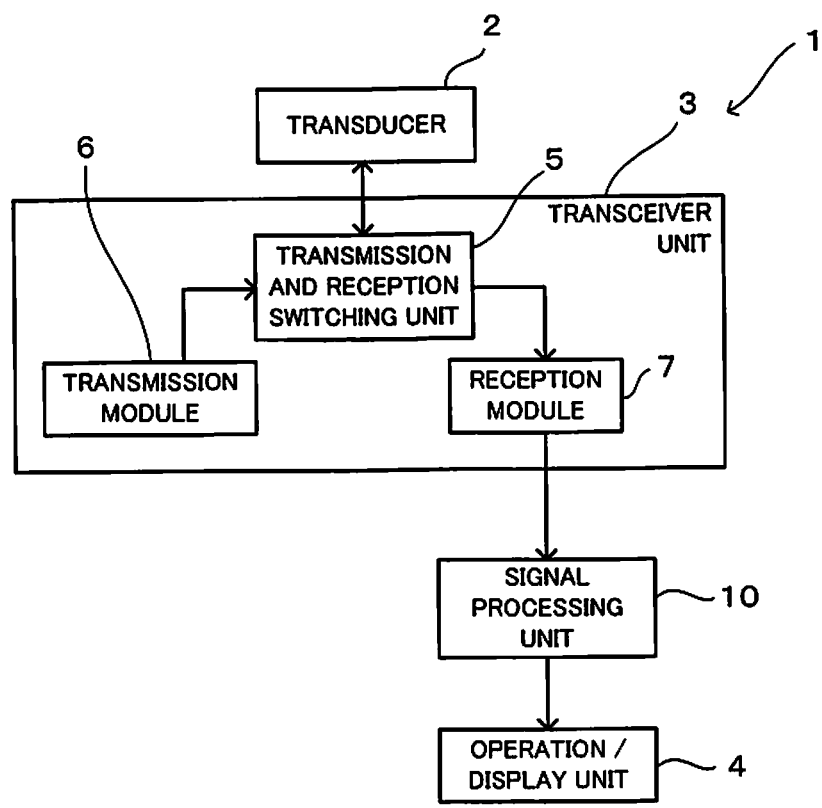
FIG. 1 shows a block diagram of an arrangement of a fish finder, according to an embodiment of the present disclosure.

FIG. 1 shows a block diagram of an arrangement of a fish finder 1 (as a detection apparatus) according to one embodiment of the present disclosure. Hereinafter, there will be explained, referring to the drawings, fish finder 1 according to one embodiment of the present disclosure. Fish finder 1 shown in FIG. 1 is arranged to estimate the fish school density within a given area in water. Fish finder 1 may be for example installed on a ship such as a fishing vessel. Note that, hereinafter, fish finder 1 uses fish as an example of target of interest but other aquatic species may also be used as target of interest.

As shown in FIG. 1, fish finder 1 comprises a transducer 2, a transceiver unit 3, a signal processing module 10 and an operation/display unit 4.

Transducer 2 may transform electrical signal into ultrasonic wave and transmit ultrasonic wave into the water, repeatedly at given timings (namely, at a given cycle). Transducer 2 may also transform received ultrasonic wave into electrical signal. A chirp wave whose frequency is gradually changing as time passes may be repeatedly transmitted at given timings and for a given duration from transducer 2 of the present embodiment.

The transceiver unit 3 is comprised of a transmission and reception switching unit 5, a transmission module 6, and a reception module 7. During transmission, the transmission and reception switching unit 5 may connect the transmission module 6 and transducer 2 to supply a transmission signal from the transmission module 6 to transducer 2. During reception, the transmission and reception switching unit 5 may connect transducer 2 and reception module 7 so that reception wave transformed into electrical signal by transducer 2 is supplied to the reception module 7.

The transmission module 6 may generate a transmission signal based on the conditions set via the operation/display unit 4 and supply the transmission signal to transducer 2 via the transmission and reception switching unit 5. In order to have a chirp wave transmitted from transducer 2 as explained above, the transmission module 6 of the present embodiment may supply a chirp signal to transducer 2 as the source of said chirp wave.

The reception module 7 may amplify the electrical signal supplied from transducer 2 and perform an Analog to Digital conversion of the amplified reception signal. The reception module 7 may then supply the converted digital reception signal to the signal processing module 10.

The signal processing module 10 may process the reception signal outputted by the reception module 7 and generate a video signal of the target. The signal processing module 10 may also estimate fish school density within the aforementioned given area. The arrangement of the signal processing module 10 will be explained in detail later.

Figure 2:
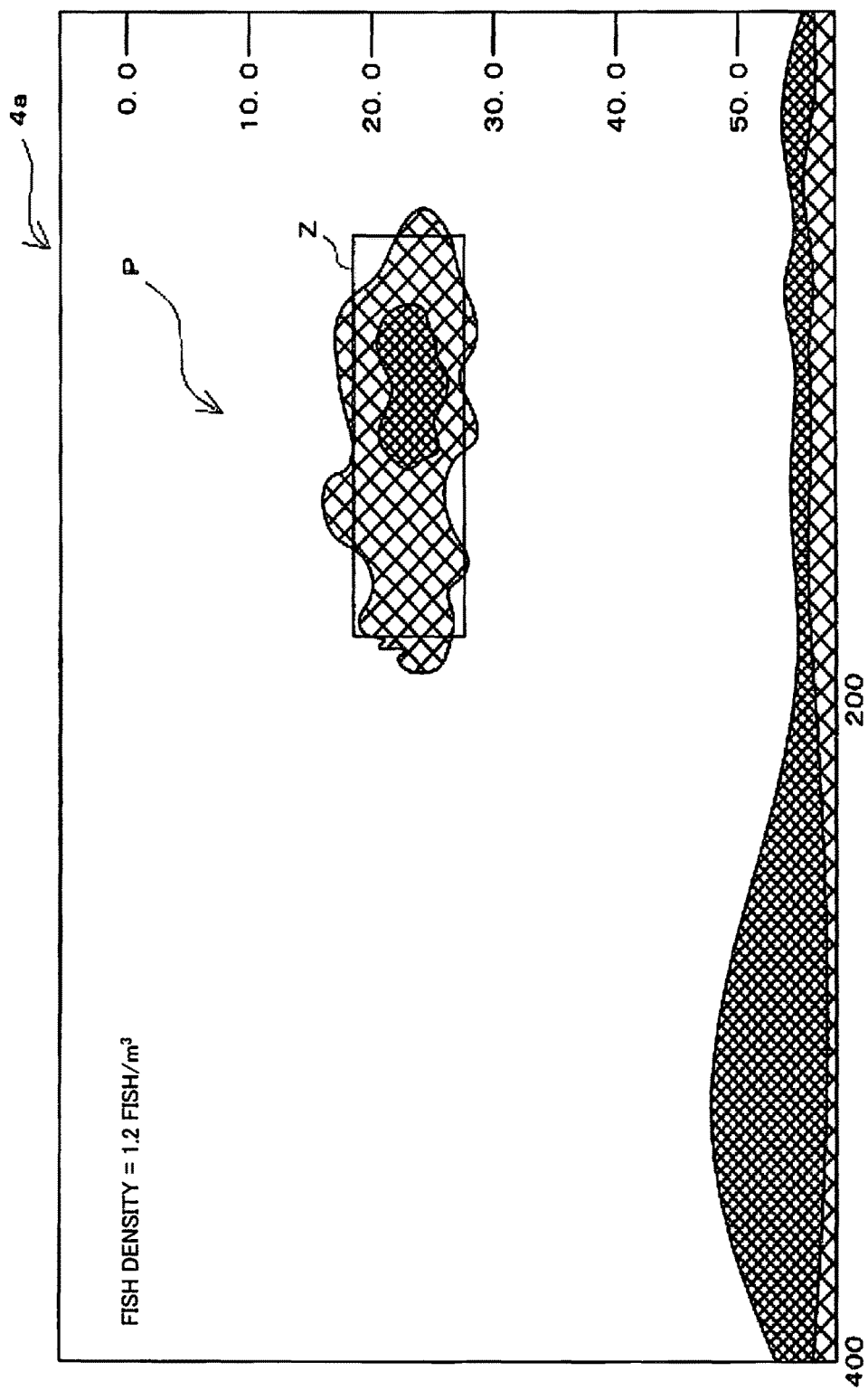
FIG. 2 shows schematically an example of a display screen of an operation/display unit of the fish finder shown in FIG. 1.

FIG. 2 shows schematically an example of a display screen 4a of the operation/display unit 4 of the fish finder 1 shown in FIG. 1. As shown in FIG. 2, the operation/display unit 4 may display on the display screen 4a an image P that corresponds to the video signal outputted by the signal processing module 10. By looking at image P on display screen 4a, a user can estimate a situation of the sea below the ship (for example presence or absence of fish, position of fish relative to own ship, etc). The operation/display unit 4 may also comprise a variety of input means such as input buttons so that various settings or parameters related to transmission and reception of ultrasonic wave, signal processing or image display can be inputted. Note that, the vertical axis of the display screen 4a shown in FIG. 2 corresponds to depth. Moreover, numerical values on the horizontal axis of display screen 4a shown in FIG. 2 represent ping numbers, one ping corresponding to one chirp wave transmission.

As shown in FIG. 2, the fish school density calculated by the signal processing module 10 may also be displayed on the display screen 4a of the operation/display unit 4. In the present embodiment, as an example, the user selects an area Z (which may also be referred to as a fish school density calculation area Z) of which he/she wishes to calculate the fish school density by the use of a mouse arranged into the operation/display unit 4 as an input means. The signal processing module 10 of fish finder 1 may then calculate the fish school density of the school within the area Z and the calculation result may be displayed on the display screen 4a.

Figure 3:
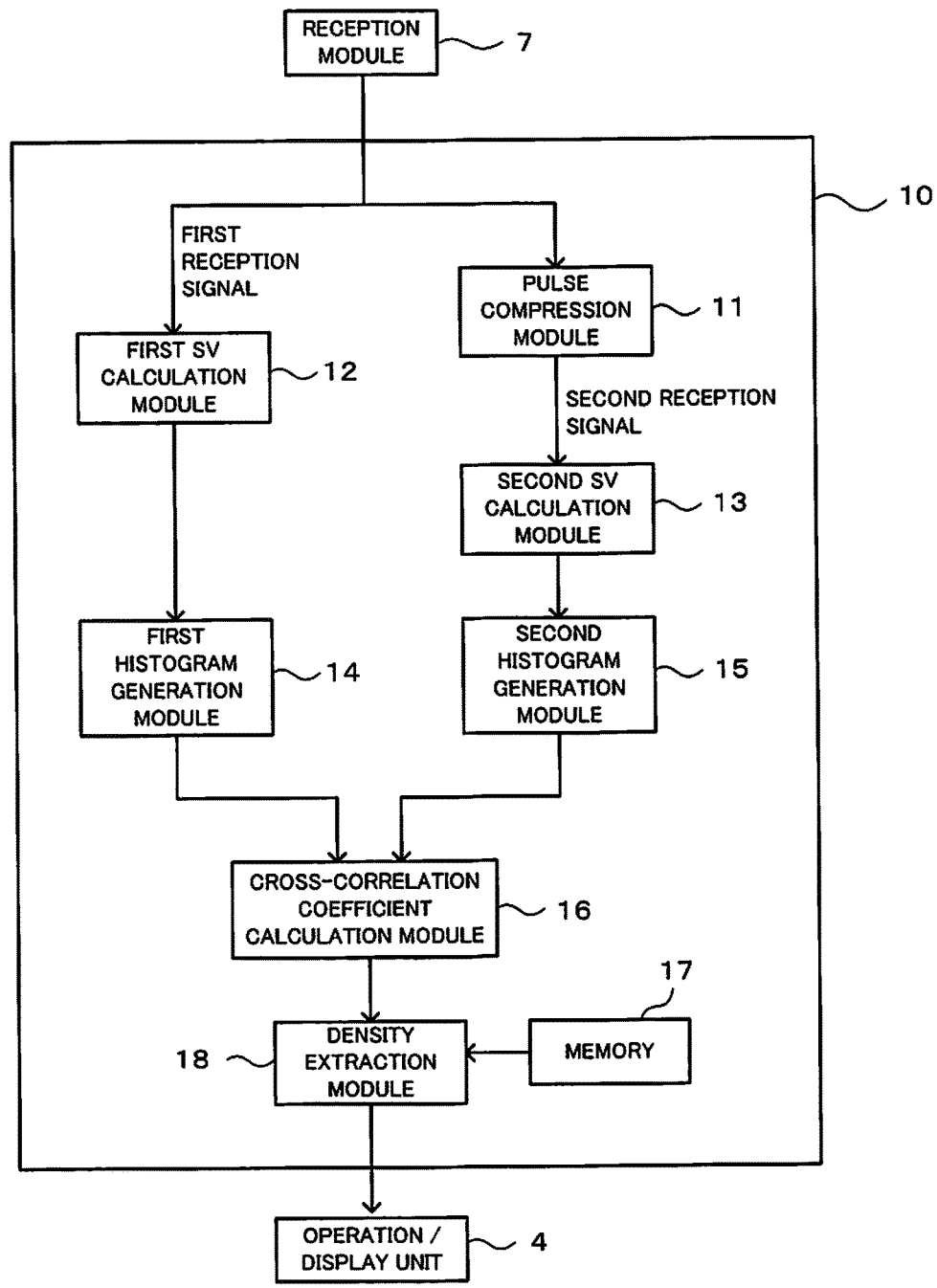
FIG. 3 shows a block diagram of an arrangement of a signal processing module of the fish finder shown in FIG. 1.

FIG. 3 shows a block diagram of an arrangement of the signal processing module 10 of fish finder 1 shown in FIG. 1. As shown in FIG. 3, the signal processing module 10 is comprised of a pulse compression module 11, a first SV calculation module 12, a second SV calculation module 13, a first histogram generation module 14, a second histogram generation module 15, a cross-correlation coefficient calculation module 16, a memory 17, and a density extraction module 18. The signal processing module 10 is for example implemented on a hardware processor (for example CPU, FPGA) and a memory (not shown on the figures). For example, by having the hardware processor read a program from the memory and execute the program, it is possible to implement the functions of the pulse compression module 11, the first SV calculation module 12, the second SV calculation module 13, the first histogram generation module 14, the second histogram generation module 15, the cross-correlation coefficient calculation module 16, and the density extraction module 18.

The pulse compression module 11 may perform a pulse compression of the reception signal outputted by the reception module 7. Specifically, the pulse compression module 11 uses for example a matched filter (not shown). The matched filter correlates the reception signal acquired from the reception wave received by transducer 2 and a reference signal set in advance based on a transmission wave (for example a chirp wave) to perform pulse compression of the reception signal. As a result, the duration of the reception signal in the depth direction is shortened and a second reception signal is generated.

The first SV calculation module 12 may calculate as echo intensity (which may also be referred to as first echo intensity) the volume backscattering strength (which may also be referred to as the SV value) based on the reception signal (which may also be referred to as the first reception signal) outputted by the reception module 7. SV value can be expressed with the following equation (1) and the first SV calculation module 12 may calculate SV value for each position along the depth. Note that, hereinafter, the SV value calculated by the first SV calculation module 12 may be called first SV value.

$$SV=EL-SL-ME+Cb+Cd \quad (1)$$

In the above equation (1), EL is a received voltage of the echo signal (EL unit is dB with reference set to 1 V), SL is a source level of the ultrasound transmission wave (SL unit is dB with reference set to 1 µPa), and ME is a wave-receiving sensitivity of the transducer (ME unit is dB with reference to 1 V/µPa).

Cb $(=-10 \log(c\tau/2)-20 \log(\theta)+31.6)$ is a correction term based on the characteristics of an ultrasound beam and Cd $(=20 \log(r)+2\alpha\tau/1000)$ is a correction term relating to attenuation in distance direction (which may also be referred to as depth direction). Here, c is a speed of sound (expressed in m/s), $\tau$ is a length (which may also be referred to as a duration and is expressed in s) of the reception signal (specifically, a length $\tau_1$ of the first reception signal and a length $\tau_2$ of the second reception signal), $\theta$ is a half angle (which may also be referred to as a half beam width) of the transmission beam (expressed in deg), r is a distance to a target (expressed in m) and $\alpha$ is an underwater absorption loss coefficient (expressed in dB/km). Specifically, as an approximation, the length $\tau_1$ of the first reception signal is set to a duration (which may also be referred to as a pulse width) of the transmission signal (for example the chirp signal) generated by the transmission module 6.

The second SV calculation module 13 may calculate as echo intensity (which may also be referred to as second echo intensity) the SV value using the above equation (1) based on the reception signal (which may also be referred to as the second reception signal) pulse compressed by the pulse compression module 11. The second SV calculation module 13 may also calculate SV value for each position along the depth, as performed by the first SV calculation module 12. Note that, hereinafter, the SV value calculated by the second SV calculation module 13 may be called second SV value. Specifically, as an approximation, the length $\tau_2$ of the second reflection signal in equation (1) is set to the duration the chirp signal generated by the transmission module 6 would have after being compressed by the pulse compression module 11. This can be calculated theoretically.

Figure 4:
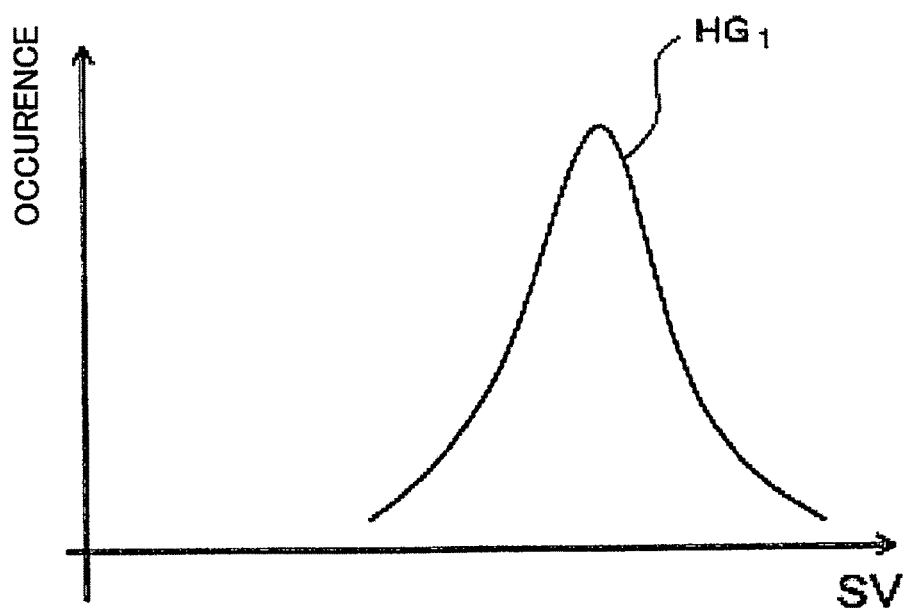
FIG. 4 shows an example of a first histogram generated by a first histogram generation module shown in FIG. 3.

FIG. 4 shows an example of a first histogram $HG_1$ (which may also be referred to as a first frequency distribution) generated by the first histogram generation module 14. For first SV values calculated at each depth position and at each ping, by counting occurrences (or frequency) of first SV values at each level (each interval obtained by segmenting an echo intensity range into a plurality of intervals in the present embodiment), the first histogram generation module 14 generates a first histogram $HG_1$ such as the one shown in FIG. 4. As an example, the first histogram generation module 14 generates the first histogram $HG_1$ for example based on first SV values calculated at each depth position and at each ping within the fish school density calculation area Z (see FIG. 2) selected by the user.

Figure 5:
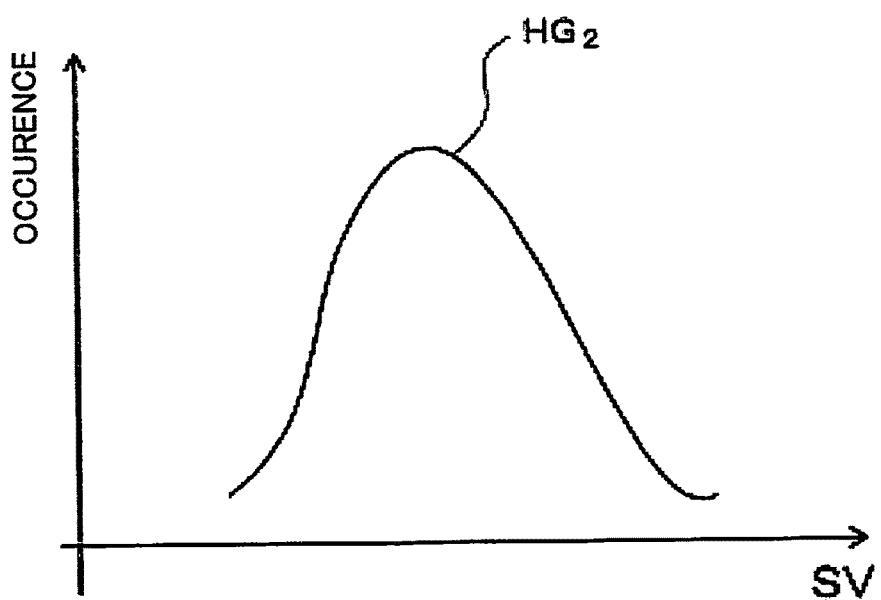
FIG. 5 shows an example of a second histogram generated by a second histogram generation module shown in FIG. 3.

FIG. 5 shows an example of a second histogram $HG_2$ (which may also be referred to as a second frequency distribution) generated by the second histogram generation module 15. For second SV values calculated at each depth position and at each ping, by counting occurrences (or frequency) of second SV values at each level, the second histogram generation module 15 generates a second histogram $HG_2$ such as the one shown in FIG. 5. In the same way as the first histogram generation module 14, the second histogram generation module 15 generates the second histogram $HG_2$ based on second SV values calculated at each depth position and at each ping within the fish school density calculation area Z (see FIG. 2).

The cross-correlation coefficient calculation module 16 may compare the first histogram $HG_1$ and the second histogram $HG_2$, and calculate a cross-correlation coefficient (i.e., a coefficient of cross-correlation between the first histogram $HG_1$ and the second histogram $HG_2$) as a result of said comparison. The cross-correlation coefficient is calculated to express a degree of similarity between the first histogram $HG_1$ and the second histogram $HG_2$. The cross-correlation coefficient is expressed as a value between 0 and 1. On one hand, when the cross-correlation coefficient is close to 1, the fish school density within the fish school density calculation area Z is relatively high; on the other hand, when the cross-correlation coefficient is close to 0, the fish school density within the fish school density calculation area Z is relatively low.

The reason why such a relation (when the cross-correlation coefficient is close to 1, the fish school density is high and when the cross-correlation coefficient is close to 0, the fish school density is low) exists between the cross-correlation coefficient calculated by the cross-correlation coefficient calculation module 16 and the fish school density within the fish school density calculation area Z is explained below.

Figure 6A:
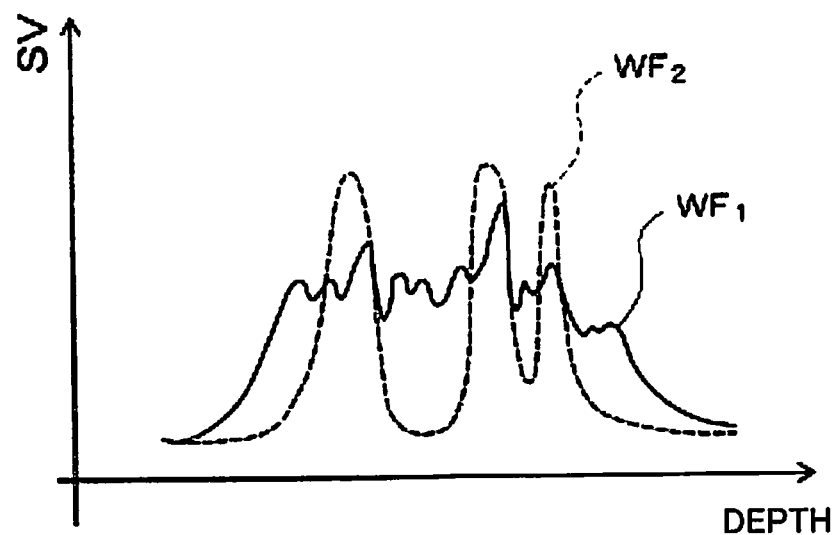
FIG. 6A shows a first SV value waveform and a second SV value waveform each with respect to depth when a fish school density is relatively low, the solid line being the first SV value waveform, the dotted line being the second SV value waveform.
Figure 6B:
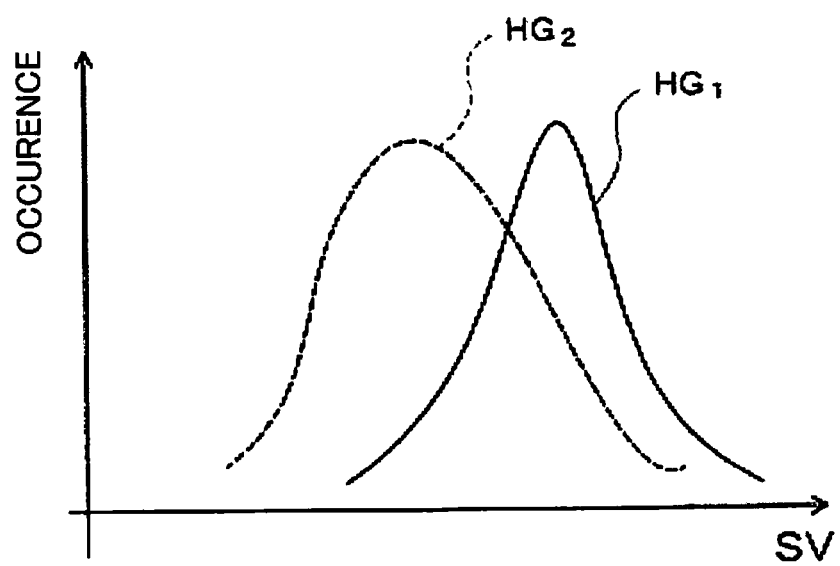
FIG. 6B shows histograms generated from each waveform shown in FIG. 6A, the solid line being a first SV value histogram, the dotted line being a second SV value histogram.

FIG. 6A shows a first SV value waveform and a second SV value waveform each with respect to depth when a fish school density is relatively low, the solid line being the first SV value waveform, the dotted line being the second SV value waveform. FIG. 6B shows histograms generated from each waveform shown in FIG. 6A, the solid line being a first SV value histogram $HG_1$ (which may also be referred to as a first frequency distribution), the dotted line being a second SV value histogram $HG_2$ (which may also be referred to as a second frequency distribution).

Figure 7A:
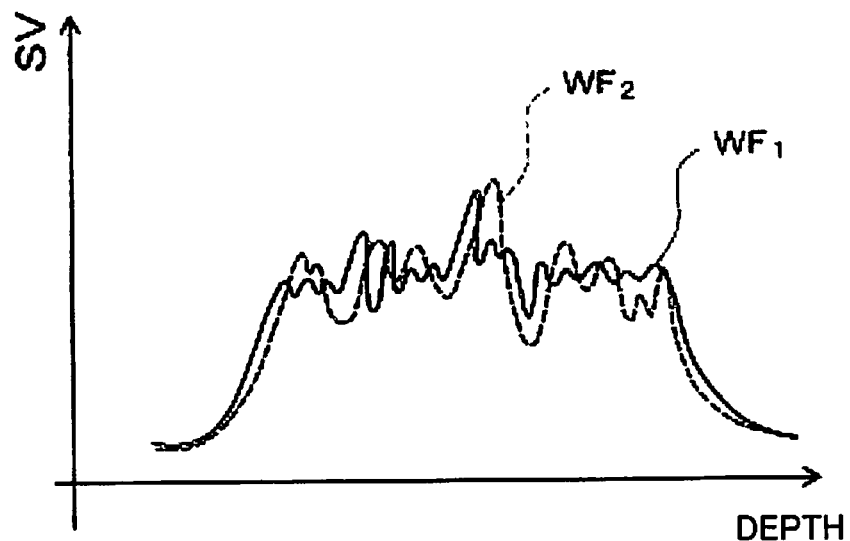
FIG. 7A shows a first SV value waveform and a second SV value waveform each with respect to depth when a fish school density is relatively high, the solid line being the first SV value waveform, the dotted line being the second SV value waveform.
Figure 7B:
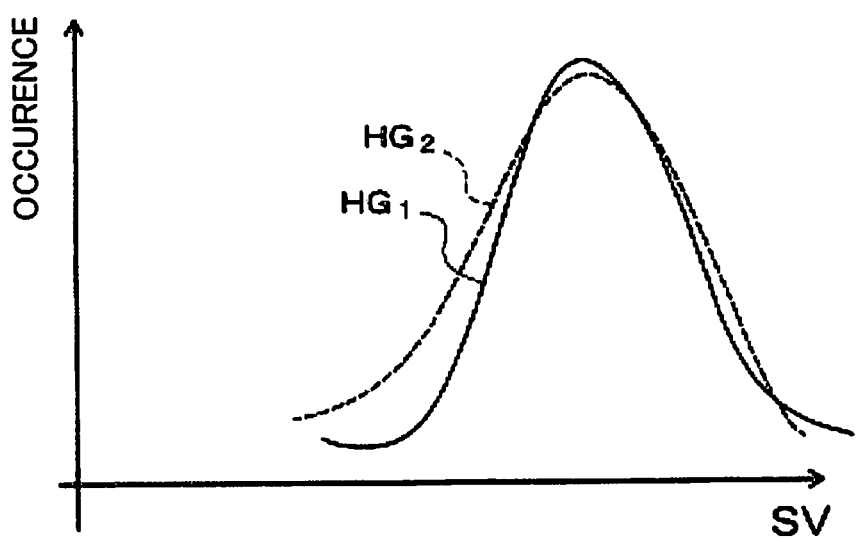
FIG. 7B shows histograms generated from each waveform shown in FIG. 7A, the solid line being a first SV value histogram, the dotted line being a second SV value histogram.

FIG. 7A shows a first SV value waveform and a second SV value waveform each with respect to depth when a fish school density is relatively high, the solid line being the first SV value waveform, the dotted line being the second SV value waveform. FIG. 7B shows histograms generated from each waveform shown in FIG. 7A, the solid line being a first SV value histogram $HG_1$ (which may also be referred to as a first frequency distribution), the dotted line being a second SV value histogram $HG_2$ (which may also be referred to as a second frequency distribution).

First, the explanation is done with reference to FIGS. 6A and 6B when the fish school density is relatively low. Due to the relatively low resolution in the depth direction of the SV value (which may also be referred to as the first SV value) generated based on the first reception signal, peak waveforms due to fish mutually interfere with each other. As a result, the first SV value waveform $WF_1$ with respect to depth is a waveform such as the solid line of FIG. 6A. On the other hand, due to the relatively high resolution in the depth direction of the SV value (which may also be referred to as the second SV value) generated based on the second reception signal, when the fish school is not that dense, peak waveforms of fish are separated. As a result, the second SV value waveform $WF_2$ with respect to depth is a waveform such as the dotted line of FIG. 6A.

When generating the histogram $HG_1$ of the waveform $WF_1$ represented by the solid line of FIG. 6A, as shown with the solid line of FIG. 6B, on the whole the histogram is located on the right hand side (i.e., the side with high SV). This is due to the fact that on the whole the level of the SV values in the waveform $WF_1$ represented by the solid line of FIG. 6A is high, due to the fact that the peak waveforms of fish are not mutually separated and mutually interfere with each other. On the other hand, when generating the histogram $HG_2$ of the waveform $WF_2$ represented by the dotted line of FIG. 6B, on the whole the histogram is located on the left hand side (i.e., the side with low SV value). This is due to the fact that there are numerous portions in between adjacent peak waveforms (i.e. portions where the level of the SV values is low), due to the fact that the peak waveforms of fish are mutually separated, as shown in FIG. 6A, which on the whole makes the SV value smaller.

Next, the explanation is done when the fish school density is relatively high. Similarly to the case when the fish school density is relatively low, peak waveforms of SV value (which may also be referred to as first SV value) generated based on the first reception signal interfere with each other. As a result, with reference to FIG. 7A, the first SV value waveform $WF_1$ with respect to depth is a waveform such as the solid line of FIG. 7A (similar to the waveform represented with the solid line of FIG. 6A). On the other hand, even though peak waveforms of SV value (which may also be referred to as second SV value) generated based on the second reception signal have a relatively high resolution in the depth direction, when the fish school density is relatively high, peak waveforms of fish interfere with each other. In such case, as shown on the waveform represented with the dotted line of FIG. 7A, the second SV value waveform has on the whole a similar shape as the first SV value waveform. As a result, as shown in FIG. 7B, when the fish school density is relatively high, the first histogram $HG_1$ and the second histogram $HG_2$ have on the whole a similar shape and a similar position.

From the reason stated above, when the fish school density is relatively low, peak positions on the SV direction of the first histogram $HG_1$ and the second histogram $HG_2$ differ greatly. Therefore, when calculating the cross-correlation coefficient of the first and second histograms $HG_1$ and $HG_2$, as the mutual correlation is low, the cross-correlation coefficient is relatively low (i.e., close to 0). On the other hand, when the fish school density is relatively high, peak positions on the SV direction and shapes of the first and second histograms $HG_1$ and $HG_2$ are on the whole similar. Therefore, the cross-correlation coefficient calculation of the first and second histograms $HG_1$ and $HG_2$ yields a relatively high value (i.e., close to 1).

The memory 17 may memorize a correspondence relationship between cross-correlation coefficient and fish school density. This correspondence relationship is obtained in advance from experiment or from simulation. This correspondence relationship could be for example a look-up table showing for each cross-correlation coefficient its correspondence with fish school density, or a formula describing a relation between cross-correlation coefficient and fish school density.

The density extraction module 18 may extract the density of the fish school within the fish school density calculation area Z from the cross-correlation coefficient calculated from the cross-correlation coefficient calculation module 16. Specifically, the density extraction module 18 reads or calculates from the correspondence relationship memorized in memory 17 the fish school density corresponding to the cross-correlation coefficient calculated by the cross-correlation coefficient calculation module 16 and extracts this fish school density as the fish school density within the fish school density calculation area Z. The fish school density extracted by the density extraction module 18 may then be displayed on the operation/display unit 4 as shown in FIG. 2.

[Effects]

As in the foregoing, fish finder 1 according to the present embodiment compares the first histogram $HG_1$ and the second histogram $HG_2$, and extracts fish school density based on the comparison result. As explained above, as the result of the comparison between the first histogram $HG_1$ and the second histogram $HG_2$ differs depending on fish school density, a more accurate fish school density can be extracted based on said comparison result than in the past.

Accordingly, fish finder 1 can accurately calculate fish school (which may also be referred to as target) density.

In order to have the duration of one of the reception signal (the second reception signal of the present embodiment) to be shorter than the duration of the first reception signal, fish finder 1 may perform pulse compression processing. Accordingly, in order to make the duration of the second reception signal shorter than the first reception signal, there is no need for example to generate two different transmission waves having two different pulse widths. Namely, as there is no need to generate a plurality of different transmission waves, the arrangement of for example the transmission module 6 is simplified.

Moreover, fish finder 1 may calculate the echo intensity of each reception signal by compensating for the duration of each reception signal. Accordingly, the first echo intensity and the second echo intensity can be appropriately calculated.

Moreover, fish finder 1 may calculate the echo intensity of each reception signal by compensating for the beam width in which the transmission wave is transmitted by the transducer. Accordingly, a more appropriate first echo intensity and second echo intensity can be calculated.

Moreover, fish finder 1 may calculate the volume backscattering strength as first echo intensity and second echo intensity. Accordingly, the well known volume backscattering strength may be used to simply calculate the first echo intensity and the second echo intensity.

Moreover, fish finder 1 may extract fish school density based on the degree of similarity between the first histogram $HG_1$ and the second histogram $HG_2$. As explained above, as the degree of similarity between the first histogram $HG_1$ and the second histogram $HG_2$ differs depending on fish school density, a more accurate fish school density can be extracted based on said degree of similarity than in the past.

Moreover, fish finder 1 may extract fish school density based on the cross-correlation coefficient between the first histogram $HG_1$ and the second histogram $HG_2$. Accordingly, fish school density can be easily calculated.

Moreover, fish finder 1 may extract fish school density based on the cross-correlation coefficient calculated by the cross-correlation coefficient calculation module 16 and the correspondence relationship between cross-correlation coefficient and fish school density memorized in memory 17. Accordingly, as fish school density can be extracted from a correspondence relationship between cross-correlation coefficient and fish school density previously obtained from experiment or from simulation, a more accurate fish school density can be calculated.

Moreover, fish finder 1 may generate the first frequency distribution by counting occurrences (or frequency) of first echo intensity in each interval obtained by segmenting the echo intensity range into a plurality of intervals and generate the second frequency distribution by counting occurrences (or frequency) of second echo intensity in each of the plurality of intervals. Accordingly, the first and second frequency distributions can be appropriately generated.

Moreover, as fish school density can be accurately extracted, efficient fishing can be performed.

[Modifications]

Although the embodiment of this disclosure is described above, this disclosure is not limited to this, and various changes may be applied without deviating from the scope of this disclosure.

Figure 8:
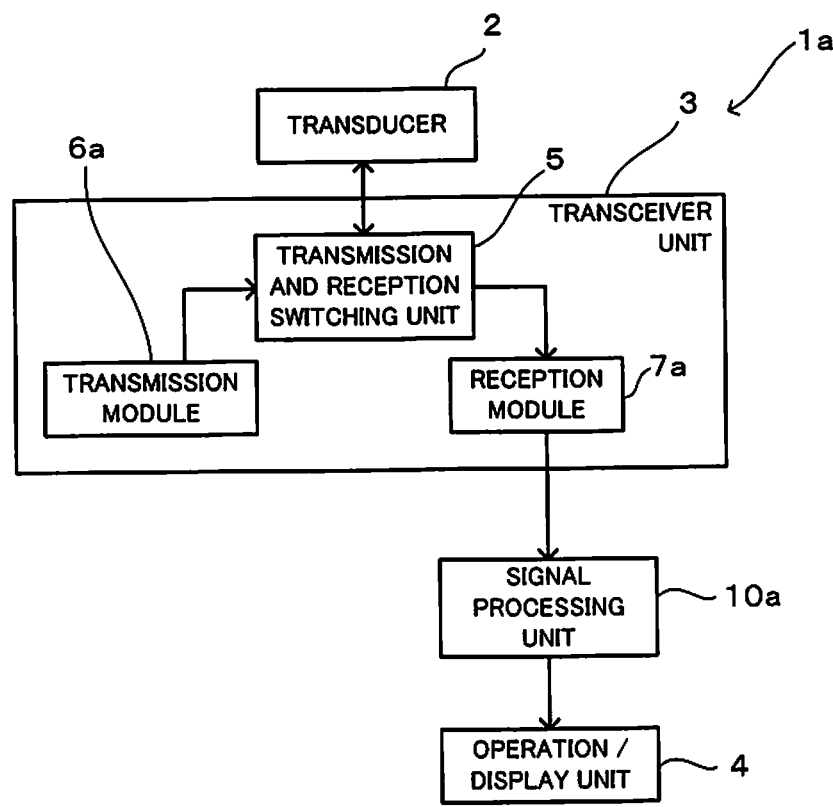
FIG. 8 shows a block diagram of an arrangement of the fish finder according to a modification.

(1) FIG. 8 shows a block diagram of an arrangement of a fish finder 1a according to a modification. Compared to the fish finder 1 of the foregoing embodiment, arrangements of transmission module 6a, reception module 7a and signal processing module 10a of the fish finder 1a of the present modification are different. Hereinafter, differences with fish finder 1 of the foregoing embodiment will be mainly explained, other explanations will be omitted.

Transmission module 6a according to the present embodiment may supply in alternation two transmission signals of mutually different pulse widths to transducer 2 so that two pulse waves (which may also be referred to as a first ultrasonic wave and a second ultrasonic wave) of mutually different pulse widths are transmitted from transducer 2. Accordingly, first ultrasonic wave and second ultrasonic wave having mutually different pulse widths are alternately transmitted from transducer 2. In the present modification, the pulse width of the second ultrasonic wave is set to be shorter that the pulse width of the first ultrasonic wave. Transducer 2 alternates between transmission/reception of the first ultrasonic wave and transmission/reception of the second ultrasonic wave. Note that, the frequency of the first ultrasonic wave and the frequency of the second ultrasonic wave can be made identical or can be made mutually different.

The reception module 7a may amplify the signal obtained from a reception wave being received by transducer 2, perform an Analog to Digital conversion of the amplified reception signal, and supply the converted digital reception signal to the signal processing module 10a, in the same way as it is done in the foregoing embodiment. The reception module 7a according to the present modification may then output the reception signal (which may also be referred to as the first reception signal) obtained from a reflection wave of the first ultrasonic wave to the first SV calculation module 12 and output the reception signal (which may also be referred to as the second reception signal) obtained from a reflection wave of the second ultrasonic wave to the second SV calculation module 13.

Figure 9:
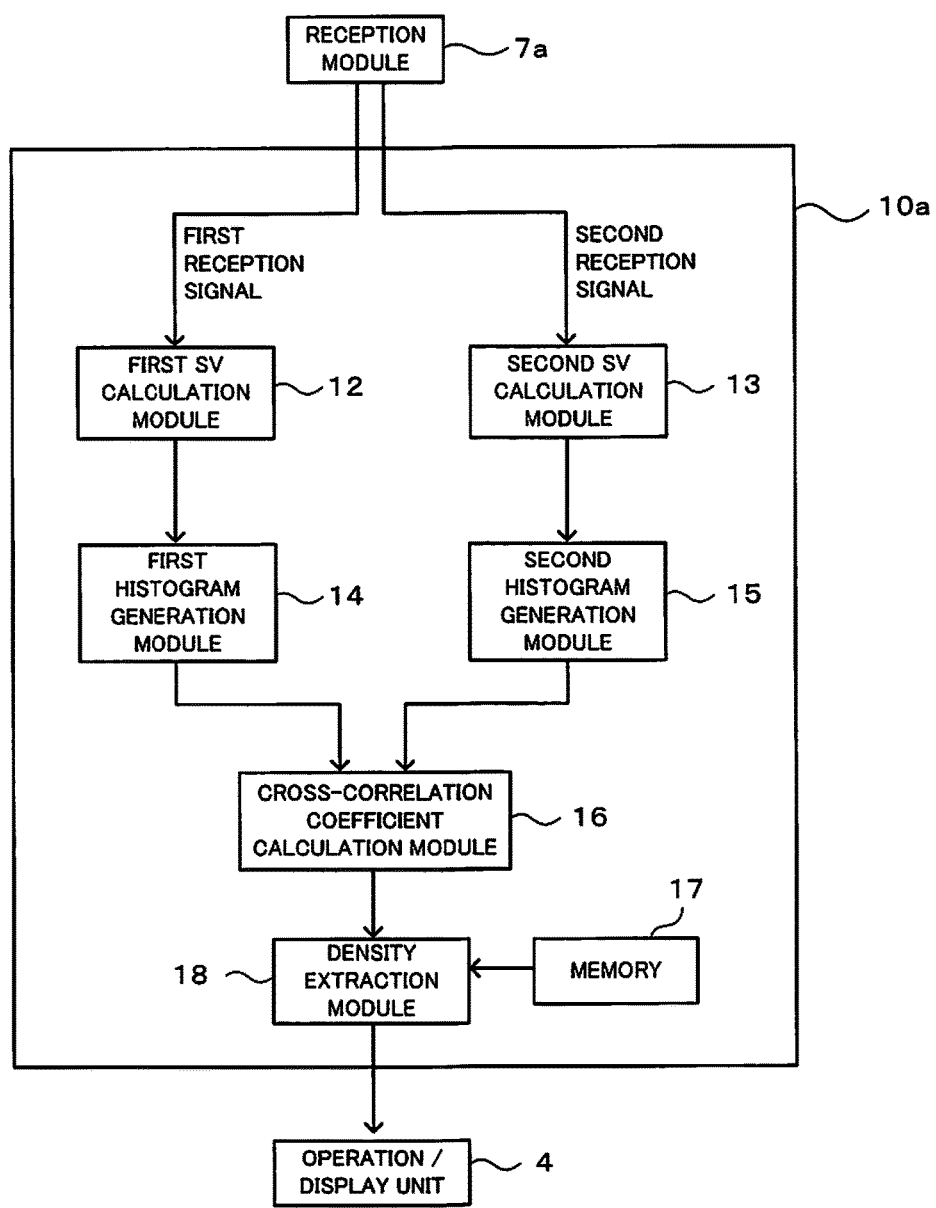
FIG. 9 shows a block diagram of an arrangement of a signal processing module of the fish finder shown in FIG. 8.

FIG. 9 shows a block diagram of an arrangement of signal processing module 10a of fish finder 1a according to the present modification. In signal processing module 10a according to the present modification, the pulse compression module is omitted compared to signal processing module 10 according to the foregoing embodiment. In signal processing module 10a according to the present modification, on one hand the first SV calculation module 12 may calculate the first SV value based on a first reception signal whose signal duration is relatively long, and on the other hand the second SV calculation module 13 may calculate the second SV value based on a second reception signal whose signal duration is shorter than the first reception signal.

Therefore, as it is done in fish finder 1 of the foregoing embodiment, with fish finder 1a of the present modification reception signals having mutually different signal durations can be each inputted to the first SV calculation module 12 and the second SV calculation module 13. Accordingly, as with fish finder 1 of the foregoing embodiment, with fish finder 1a of the present modification fish school density can be accurately extracted.

Note that, in the present modification, the transmission module and the transducer can be arranged so that the first ultrasonic wave and the second ultrasonic wave are transmitted simultaneously. In this case, the frequency of the first ultrasonic wave and the frequency of the second ultrasonic wave need to be set to mutually different frequency values so that the ultrasonic waves are mutually separable.

(2) In fish finder 1 of the foregoing embodiment, pulse compression module 11 has been used to shorten the signal duration of the reception signal, but this should not be a limitation. Specifically, inverse filtering, adaptive beamforming or other methods to compress the signal duration of the reception signal can be used.

(3) In the foregoing embodiment, a chirp wave is transmitted from transducer 2 but it should not a limitation as other waveforms can also be used.

(4) In the foregoing embodiment, volume backscattering strength is used as first echo intensity and second echo intensity, but this should not be a limitation. Specifically, echo intensity can be calculated for example by compensating for the duration of the reception signal or by compensating for the beam width in which the transmission wave is transmitted by the transducer.

Figure 10:
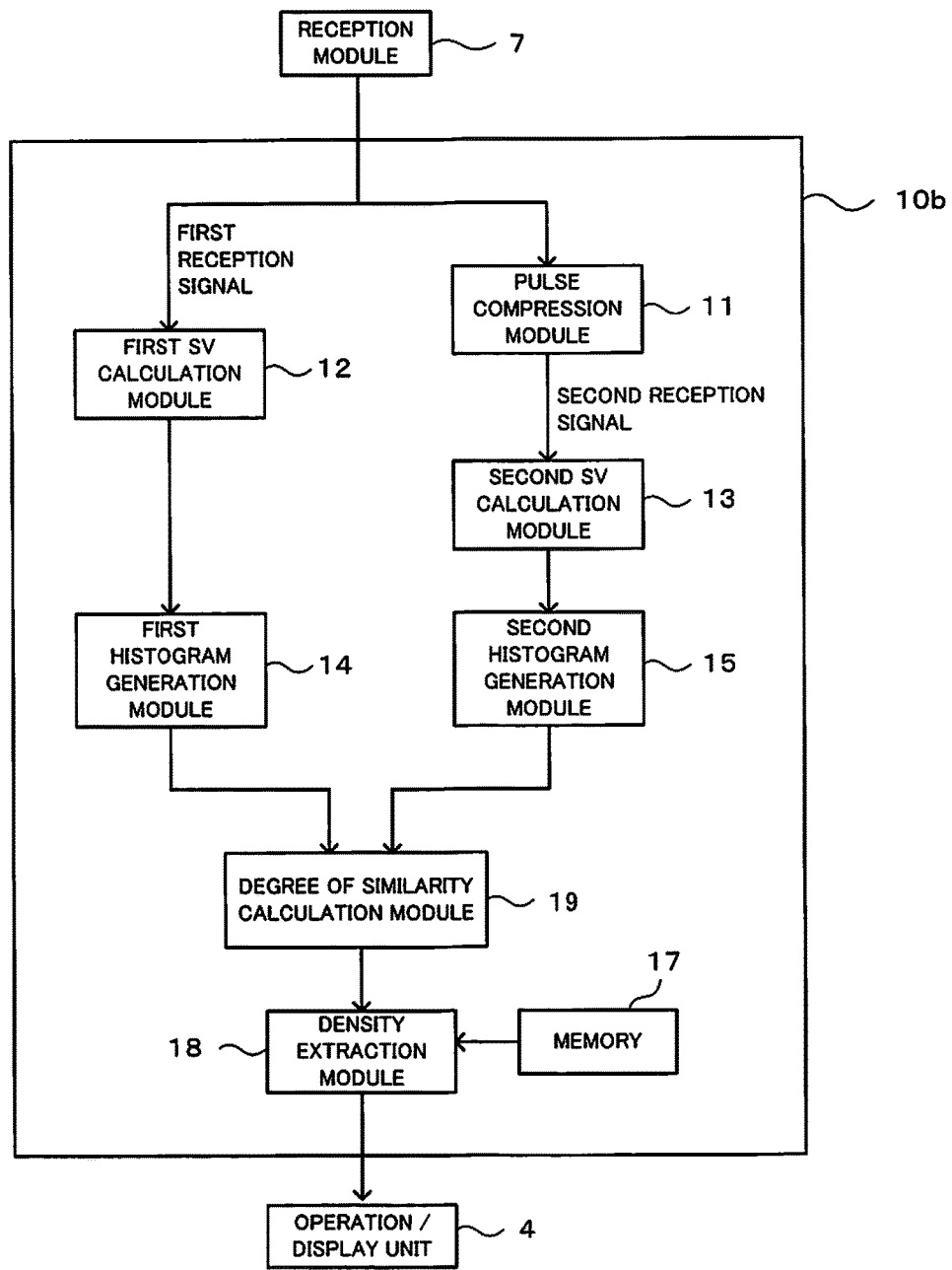
FIG. 10 shows a block diagram of an arrangement of a signal processing module according to a modification.

(5) FIG. 10 shows a block diagram of an arrangement of a signal processing module 10b according to a modification. The signal processing module 10b of FIG. 10 shows an arrangement where the cross-correlation coefficient calculation module 16 is omitted in comparison with the foregoing embodiment and it is replaced by a degree of similarity calculation module 19.

In the foregoing embodiment, a cross-correlation coefficient calculation module 16 is arranged in signal processing module 10 to calculate the cross-correlation coefficient to express the degree of similarity, but this should not be a limitation. Specifically, as an example, the signal processing module 10b of the fish finder of FIG. 10 may calculate the degree of similarity based on a measure of an overlapping area of the first and second histograms $HG_1$ and $HG_2$. As with the foregoing embodiment, fish school density can be accurately extracted with such arrangement.

(6) In the foregoing embodiment, fish school density is extracted based on the degree of similarity (specifically, cross-correlation coefficient) between the first histogram $HG_1$ and the second histogram $HG_2$, but this should not be a limitation. Specifically, as an example, fish school density can be extracted based on a gap between peak positions of the first and second histograms $HG_1$ and $HG_2$.

(7) In the foregoing embodiment, fish school density is extracted based on the cross-correlation coefficient between the first histogram $HG_1$ and the second histogram $HG_2$, but fish school density can be extracted not only based on said cross-correlation coefficient but by including other parameters (for example, as mentioned above, such parameters as the overlapping area of the two histograms, the gap between peak positions of the two histograms, etc) for a comprehensive consideration.

(8) In the foregoing embodiment and modifications, a fish finder is used as a detection apparatus example, but this should not be a limitation. This can be applied to radar.

Figure 11:
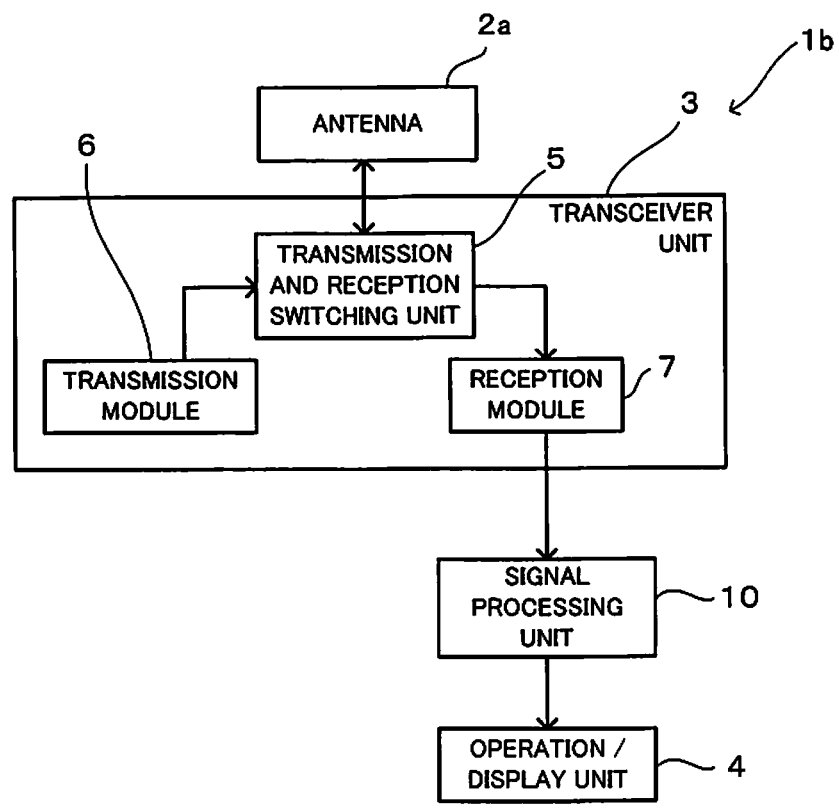
FIG. 11 shows a block diagram of an arrangement of a radar, according to another embodiment of the present disclosure.

FIG. 11 shows a block diagram of an arrangement of a radar 1b according to another embodiment of the present disclosure. With radar 1b, density of targets (for example ships around own ship) above water level, bird group density, or raindrop density, etc can be detected. Radar 1b is installed in an appropriate location depending on the targets from which density is to be extracted. Hereinafter, differences of radar 1b with fish finder 1 of the foregoing embodiment will be mainly explained. Arrangements identical to the arrangements in fish finder 1 will be attributed with the same reference numerals and explanations of said identical arrangements will be omitted.

As shown in FIG. 11, radar 1b comprises an antenna 2a for transmitting and receiving electromagnetic waves, a transceiver unit 3, a signal processing module 10 and an operation/display unit 4.

Apart from the fact that transceiver unit 3, signal processing module 10 and operation/display unit 4 of radar 1b handle electromagnetic waves as reception and transmission waves, and that targets from which density is extracted are different from fish (for example ships around own ship, bird group, raindrop, etc), radar 1b operates in an identical way to fish finder 1 of the foregoing embodiment. Accordingly, density of ships around own ship, bird group, raindrop, etc can be accurately extracted with radar 1b.

Figure 12:
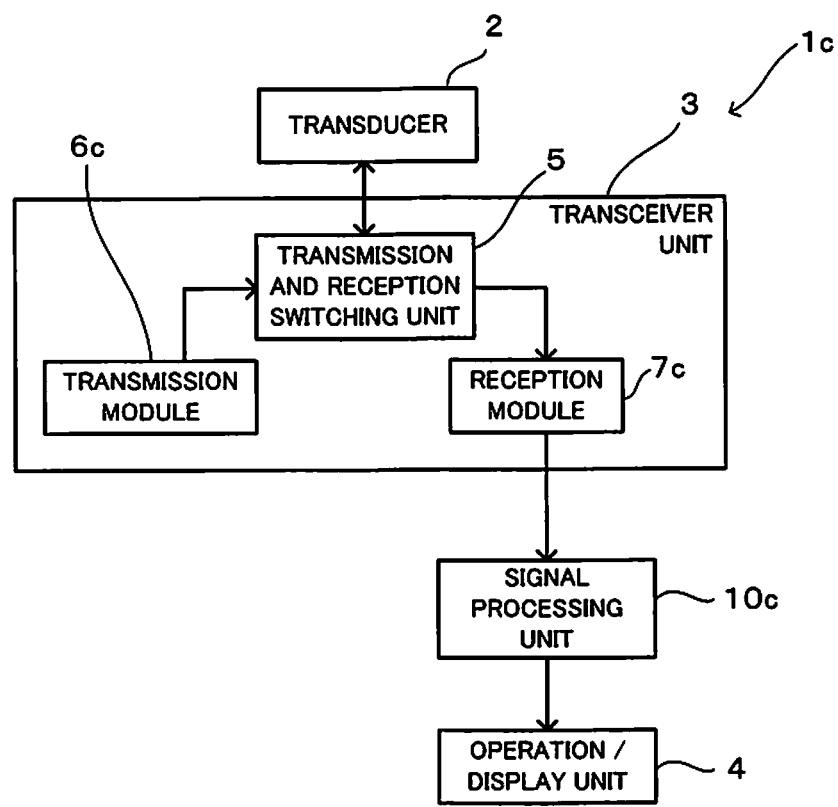
FIG. 12 shows a block diagram of an arrangement of the fish finder according to a modification.
Figure 13:
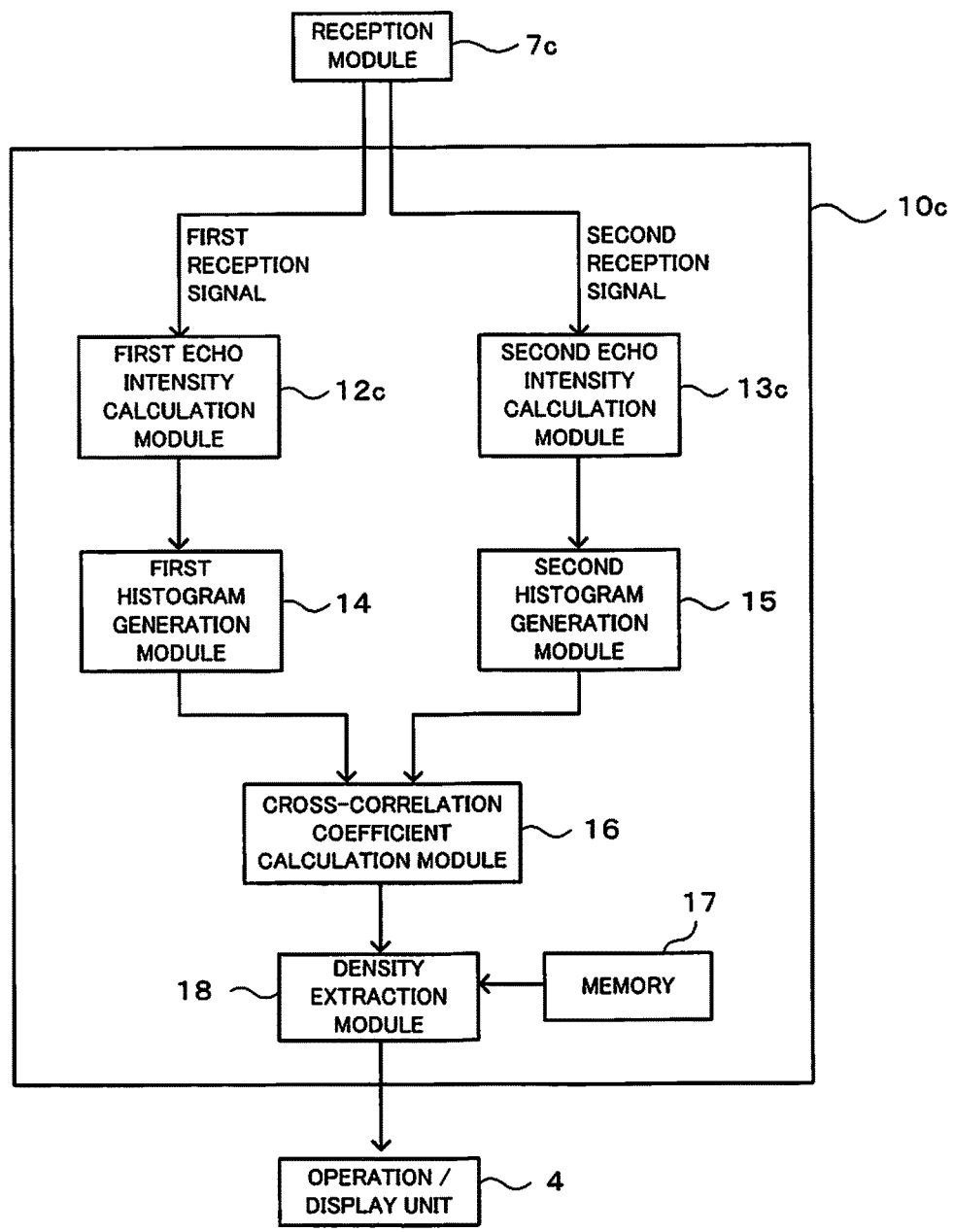
FIG. 13 shows a block diagram of an arrangement of a signal processing module of the fish finder shown in FIG. 12.

(9) FIG. 12 shows a block diagram of an arrangement of a fish finder 1c according to a modification. FIG. 13 shows a block diagram of an arrangement of a signal processing module 10c of the fish finder 1c shown in FIG. 12. Compared to the arrangement of the fish finder 1a of the modification shown in FIG. 8, the arrangement of transmission module 6c, reception module 7c and signal processing module 10c of the fish finder 1c of the present modification differs. Hereinafter, differences with fish finder 1a shown in FIG. 8 will be mainly explained, other explanations will be omitted.

Transmission module 6c may supply in alternation two transmission signals of mutually different frequencies to transducer 2 so that two pulse waves (which may also be referred to as a first transmission wave and a second transmission wave) of mutually different beam widths are transmitted from transducer 2. Accordingly, first ultrasonic wave (which may also be referred to as first transmission wave) and second ultrasonic wave (which may also be referred to as second transmission wave) having mutually different beam widths are alternately transmitted from transducer 2. In the present modification, the beam width of the second ultrasonic wave is set to be smaller than the beam width of the first ultrasonic wave. Transducer 2 alternates between transmission/reception of the first ultrasonic wave and transmission/reception of the second ultrasonic wave.

The reception module 7c may amplify the signal obtained from a reception wave being received by transducer 2, perform an Analog to Digital conversion of the amplified reception signal, and supply the converted digital reception signal to the signal processing module 10c, in the same way as it is done in the foregoing embodiment. The reception module 7c according to the present modification may then output the reception signal (which may also be referred to as the first reception signal) obtained from a reflection wave of the first ultrasonic wave to a first echo intensity calculation module 12c of the signal processing module 10c and output the reception signal (which may also be referred to as the second reception signal) obtained from a reflection wave of the second ultrasonic wave to a second intensity calculation module 13c of the signal processing module 10c.

The signal processing 10c may be arranged so that the first SV calculation module 12 of the signal processing module 10a shown in FIG. 9 is replaced by the first echo intensity calculation module 12c and the second SV calculation module 13 is replaced by the second echo intensity calculation module 13c. The first echo intensity calculation module 12c may use the echo intensity of the first reception signal compensated with the beam width of the first ultrasonic wave as the first echo intensity. The second echo intensity calculation module 13c may use the echo intensity of the second reception signal compensated with the beam width of the second ultrasonic wave as the second echo intensity.

In signal processing module 10c of the present modification, as explained above, for first echo intensity calculated at each depth position and at each ping, by counting occurrences (or frequency) of first echo intensity at each level, the first histogram generation module 14 may generate first histogram. Moreover, in signal processing module 10c of the present modification, as explained above, for second echo intensity calculated at each depth position and at each ping, by counting occurrences (or frequency) of second echo intensity at each level, the second histogram generation module 15 may generate second histogram. As the remaining processing of signal processing module 10c is identical to the foregoing embodiment, explanation is omitted.

As fish finder 1 of the foregoing embodiment, fish finder 1c of the present modification can accurately calculate fish school (which may also be referred to as target) density.

Moreover, fish finder 1c may calculate the echo intensity of each reception signal by compensating for the beam width of each transmission signal. Accordingly, the first echo intensity and the second echo intensity can be appropriately calculated.

Note that in the present modification, the echo intensity of the first reception signal compensated with the beam width of the first ultrasonic wave is used as the first echo intensity, and the echo intensity of the second reception signal compensated with the beam width of the second ultrasonic wave is used as the second echo intensity. However, without any limitation to this, the echo intensity of the first reception signal compensated with a duration of the first reception signal can be used as the first echo intensity, and the echo intensity of the second reception signal compensated with a duration of the second reception signal can be used as the second echo intensity. Still without any limitation to this, volume backscattering strength can be used as the first echo intensity and the second echo intensity.

Moreover, in the present modification, in order to form two transmission waves having mutually different beam widths, transmission waves having mutually different frequencies are formed but this should not be a limitation. Specifically, as an example, it is possible to adjust the beam width of the transmission wave transmitted by each transducer by having transducers with mutually different shapes or transducers containing mutually a different number of ultrasonic elements, or transducers containing an ultrasonic element of mutually different size.

Moreover, in the present modification, transducer 2 transmits in alternation and repeatedly first transmission wave and second transmission wave, but this should not be a limitation as it is possible to simultaneously transmit first and second transmission waves. In this case, the frequency of the first transmission wave and the frequency of the second transmission wave need to be set to mutually different frequencies.

(10) In the foregoing embodiment, when calculating the echo intensity using equation (1), as an approximation, the length of the first reception signal is set to the duration of the transmission signal (for example the chirp signal) generated by the transmission module, and as an approximation, the length of the second reflection signal is set to the duration the chirp signal generated by the transmission module would have after being compressed by the pulse compression module, but it should not be a limitation. Without performing any approximation, the actual length of each reception signal can be measured. For example, the length of each reception signal can be simply measured by calculating the time difference between the rising and falling edges of the reception signal.

(11) In the foregoing embodiment, the density extraction module 18 reads or calculates from the correspondence relationship memorized in memory 17 the fish school density corresponding to the cross-correlation coefficient calculated by the cross-correlation coefficient calculation module 16, but this should not be a limitation. The density extraction module may simply output the cross-correlation coefficient as an index of the fish school density. A value of the cross-correlation close to 0 being representative of a relatively low fish density and a value of the cross-correlation close to 1 being representative of a relatively high fish school density, simply displaying the cross-correlation coefficient can be enough for the user to grasp fish school density. Still without any limitation to this, the density extraction module may output the degree of similarity as an index of the fish school density.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A detection apparatus, comprising:
   a hardware processor programmed to:
      generate a first reception signal from a reception wave reflected on reflection objects, and a second reception signal from the reception wave reflected on the reflection objects, a signal duration of the second reception signal being shorter than that of the first reception signal,
      calculate a first echo intensity of the first reception signal,
      calculate a second echo intensity of the second reception signal,
      generate a first frequency distribution of the first echo intensity,
      generate a second frequency distribution of the second echo intensity, and extract a density of the reflection objects or an index of density of the reflection objects based on a comparison of the first frequency distribution and the second frequency distribution.

2. The detection apparatus of claim 1, further comprising:
a transducer configured to transmit a transmission wave, wherein
the hardware processor is further programmed to:
compress the first reception signal generated from the reception wave resulting from a reflection of the transmission wave on the reflection objects to generate the second reception signal.

3. The detection apparatus of claim 2, wherein the hardware processor is further programmed to:
calculate the first echo intensity by compensating for a beam width in which the transmission wave is transmitted by the transducer, and
calculate the second echo intensity by compensating for the beam width.

4. The detection apparatus of claim 3, wherein the hardware processor is further programmed to:
calculate the first echo intensity by compensating for the duration of the first reception signal, and
calculate the second echo intensity by compensating for the duration of the second reception signal.

5. The detection apparatus of claim 1, wherein the hardware processor is further programmed to:
calculate volume backscattering strength of the first reception signal as the first echo intensity, and
calculate volume backscattering strength of the second reception signal as the second echo intensity.

6. The detection apparatus of claim 1, wherein the hardware processor is further programmed to:
calculate the first echo intensity by compensating for the duration of the first reception signal, and
calculate the second echo intensity by compensating for the duration of the second reception signal.

7. The detection apparatus of claim 1, wherein the hardware processor is further programmed to:
generate the first frequency distribution by counting occurrences of the first echo intensity in each interval obtained by segmenting an echo intensity range into a plurality of intervals, and
generate the second frequency distribution by counting occurrences of the second echo intensity in each said interval.

8. A fish finder comprising the detection apparatus of claim 1, wherein the hardware processor is programmed to extract the density or the index of density of a fish school as the reflection objects.

9. A radar comprising the detection apparatus of claim 1.

10. The detection apparatus of claim 1, wherein the hardware processor is further programmed to:
extract the density of the reflection objects or the index of density of the reflection objects based on a degree of similarity between the first frequency distribution and the second frequency distribution as a result of the comparison between the first frequency distribution and the second frequency distribution.

11. The detection apparatus of claim 10, wherein the hardware processor is further programmed to:
extract the density of the reflection objects or the index of density of the reflection objects based on a coefficient of cross-correlation between the first frequency distribution and the second frequency distribution as the degree of similarity.

12. The detection apparatus of claim 11, further comprising:
a memory configured to memorize a relationship between the cross-correlation coefficient and the density of the reflection objects, the relationship being obtained before the density of the reflection objects or the index of density of the reflection objects is extracted by the hardware processor, wherein
the hardware processor is further programmed to:
calculate the cross-correlation coefficient, and
extract the density of the reflection objects based on the calculated cross-correlation coefficient and the relationship memorized by the memory.

13. A detection apparatus, comprising:
a transducer configured to transmit a first transmission wave and a second transmission wave, a beam width of the second transmission wave being smaller than that of the first transmission wave; and
a hardware processor programmed to:
calculate a first echo intensity of a first reception signal generated from a reception wave corresponding to a reflection of the first transmission wave on reflection objects,
calculate a second echo intensity of a second reception signal generated from a reception wave corresponding to a reflection of the second transmission wave on the reflection objects,
generate a first frequency distribution of the first echo intensity,
generate a second frequency distribution of the second echo intensity, and
extract a density of the reflection objects or an index of density of the reflection objects based on a comparison of the first frequency distribution and the second frequency distribution.

14. The detection apparatus of claim 13, wherein the hardware processor is further programmed to:
calculate the first echo intensity by compensating for the beam width of the first transmission wave, and
calculate the second echo intensity by compensating for the beam width of the second transmission wave.

15. The detection apparatus of claim 14, wherein the hardware processor is further programmed to:
calculate the first echo intensity by compensating for a duration of the first reception signal, and
calculate the second echo intensity by compensating for a duration of the second reception signal.

16. A detection apparatus, comprising:
a transducer configured to transmit a first transmission wave and a second transmission wave, a pulse width of the second transmission wave being shorter than that of the first transmission wave, and
a hardware processor programmed to:
calculate a first echo intensity based on a reception wave resulting from a reflection of the first transmission wave on the reflection objects,
calculate a second echo intensity based on a reception wave resulting from a reflection of the second transmission wave on the reflection objects,
generate a first frequency distribution of the first echo intensity,
generate a second frequency distribution of the second echo intensity, and
extract a density of the reflection objects or an index of density of the reflection objects based on a comparison of the first frequency distribution and the second frequency distribution.

17. The detection apparatus of claim 3, wherein the hardware processor is further programmed to:
   calculate the first echo intensity by compensating for a beam width in which the first transmission wave is transmitted by the transducer, and
   calculate the second echo intensity by compensating for a beam width in which the second transmission wave is transmitted by the transducer.

18. The detection apparatus of claim 17, wherein the hardware processor is further programmed to:
   calculate the first echo intensity by compensating for the duration of the first reception signal, and
   calculate the second echo intensity by compensating for the duration of the second reception signal.

\* \* \* \* \*